United States Patent [19]
Igata

[11] 3,869,130
[45] Mar. 4, 1975

[54] SPINDLE ADAPTER APPARATUS
[75] Inventor: Toyonori Igata, Fukuroi, Japan
[73] Assignee: Pioneer Electronic Corporation, Tokyo, Japan
[22] Filed: Oct. 11, 1973
[21] Appl. No.: 405,734

[30] Foreign Application Priority Data
Oct. 12, 1972   Japan............................ 47-102270

[52] U.S. Cl. ............................................. 274/10 S
[51] Int. Cl. ........................................ G11b 17/16
[58] Field of Search ................................. 274/10 S

[56]         References Cited
         UNITED STATES PATENTS
2,898,117   8/1959   Vistain.............................. 274/10 S
3,241,838   3/1960   Morrison .......................... 274/10 S
     FOREIGN PATENTS OR APPLICATIONS
282,713   1/1965   Netherlands...................... 274/10 S
1,130,776   2/1957   France............................. 274/10 S

*Primary Examiner*—Harry N. Haroian
*Attorney, Agent, or Firm*—Sughrue, Rothwell, Mion, Zinn & Macpeak

[57]         ABSTRACT

A spindle adapter apparatus having two stop plates separated by a distance equal to the thickness of one record, each of said stop plates being movable back and forth between an extended position in which it can support one or more records and a retracted position in which records can be slid over it without interference. The location of the stop plates is controlled by an operative shaft which is axially movable among three axial positions and rotatably movable between two rotary positions. If the operative shaft is moved in an appropriate sequence by external means, the stop plates are caused to move in a manner permitting the following events in sequential order: (1) a stack of records is first supported entirely by the lower stop plate, the upper stop plate being in its retracted position, (2) the upper stop plate is then moved from its retracted to its extended position, assuming the support of all but the bottom record, (3) the lower stop plate is moved to its retracted position, permitting the bottom record to fall onto a turntable, and (4) the lower stop plate is moved to its extended position while the upper stop plate is moved to its retracted position, permitting the remaining records to drop from the position in which they had been supported by the upper stop plate to a position in which they are supported by the lower stop plate.

9 Claims, 4 Drawing Figures

SPINDLE ADAPTER APPARATUS

FIELD OF THE INVENTION

This invention relates to automatic record players and, in particular, to a spindle adapter apparatus designed to successively drop individual records onto a turntable.

SUMMARY OF THE INVENTION

This invention comprises a spindle adapter apparatus having two stop plates separated by a distance equal to the thickness of one record, each of said stop plates being movable back and forth between an extended position in which it can support one or more records and a retracted position in which records can be slid over it without interference. The location of the stop plates is controlled by an operative shaft which is axially movable among three axial positions and rotatably movable between two rotary positions. If the operative shaft is moved in an appropriate sequence by external means, the stop plates are caused to move in a manner permitting the following events in sequential order; (1) a stack of records is first supported entirely by the lower stop plate, the upper stop plate being in its retracted position, (2) the upper stop plate is then moved from its retracted to its extended position, assuming the support of all but the bottom record, (3) the lower stop plate is moved to its retracted position, permitting the bottom record to fall onto a turntable, and (4) the lower stop plate is moved to its extended position while the upper stop plate is moved to its retracted position, permitting the remaining records to drop from the position in which they had been supported by the upper stop plate to a position in which they are supported by the lower stop plate.

DETAILED DESCRIPTION OF THE PREFERRED EMBODIMENT

Figures 1, 2:
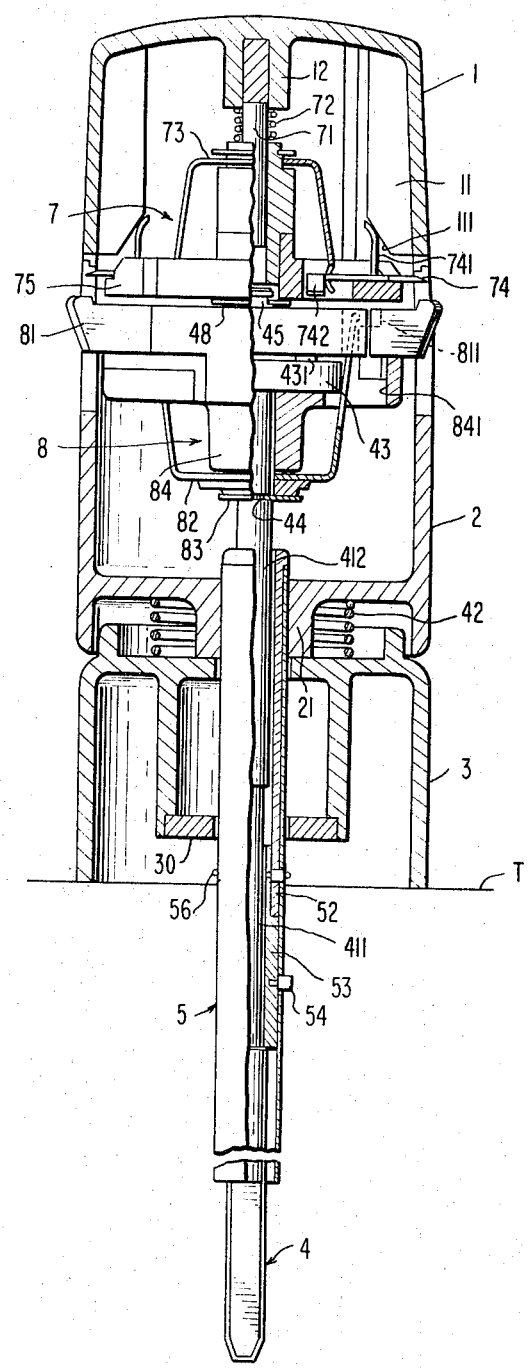
FIG. 1 is a cross-sectional view of a preferred embodiment of the present invention inserted in a record-player turntable.
FIG. 2 is an elevational view of two components of the preferred embodiment shown in FIG. 1 — namely, an operative shaft and a cam.
Figure 3:
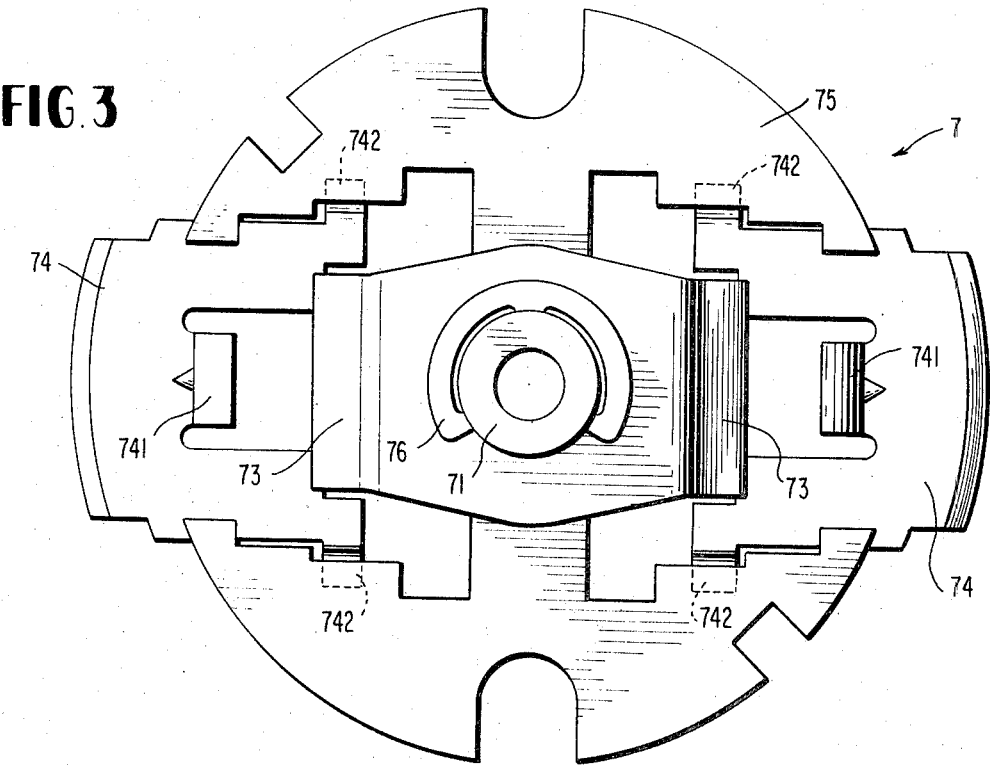
FIG. 3 is a plan view of a number of components of the preferred embodiment shown in FIG. 1, such components being referred to collectively as the first control mechanism.
Figure 4:
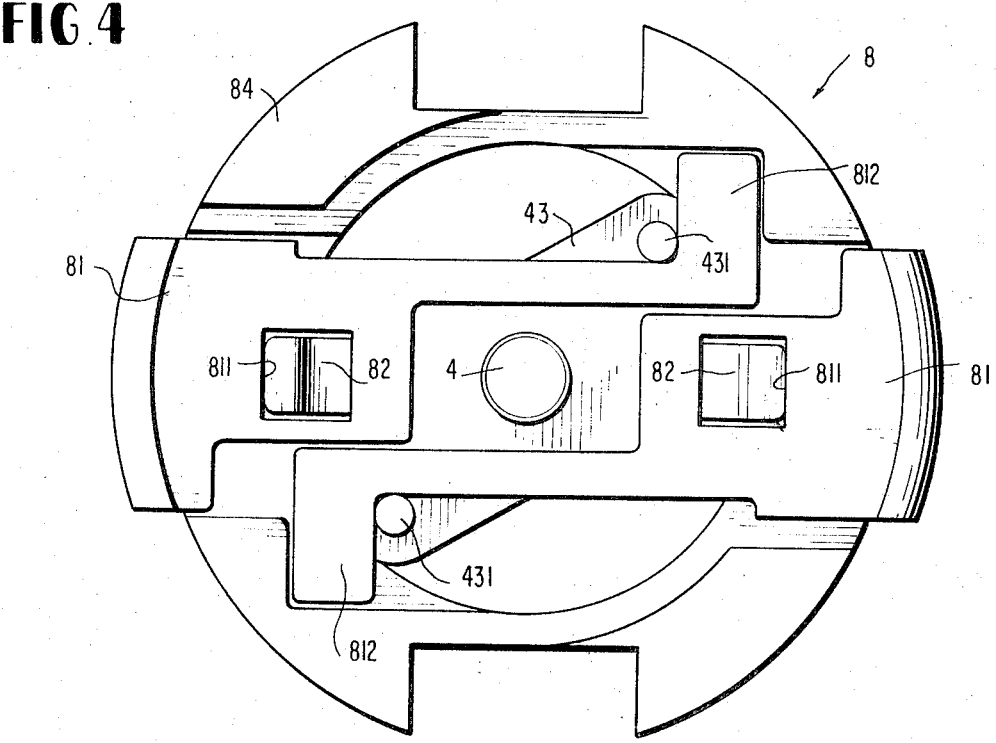
FIG. 4 is a plan view of a number of components of the preferred embodiment shown in FIG. 1, such components being referred to collectively as the second control mechanism.

As shown in FIG. 1, the general exterior configuration of the preferred embodiment of the present invention is that of a capped cylinder the cylindrical exterior of which is shaped to engage the central aperture of record discs to be played. The capped cylinder is composed of an upper portion 1, a middle portion 2, and a lower portion 3. The lower portion 3 rotates with the turntable T, but the upper portion 1, the middle portion 2, and the operative shaft 4 (to be described in detail further on in this specification) do not. The middle portion 2 and the lower portion 3 are coupled resiliently by way of a spring 42, but restricted in their relative movement by a stop ring 56 located on the exterior of a bearing 5 which is secured to an extension 21 of the middle portion 2. A first control mechanism 7 (depicted in plan view in FIG. 3) which successively releases individual records and a second control mechanism 8 (depicted in plan view in FIG. 4) which temporarily supports and then drops the individual records released by the first control mechanism 7 are provided in the upper portion 1 of the cylinder and the middle portion 2, respectively.

The first control mechanism 7 is composed of a first control stand 75 molded from synthetic resin, first stop plates 74, leaf springs 73 abutting the stop plates 74, a fixed shaft 71 secured to the upper cylinder 1, and a spring 72 which surrounds the fixed shaft 71 with one end being abutted to an shaft securing portion 12 of the upper cylinder portion 1 and the other end abutted to the first control stand 75. The first control stand 75 is movably attached to the fixed shaft 71 and biased downwardly by the spring 72 to a limit provided by a stop projection (not shown) located on the inner surface of the upper cylinder portion 1. The first control stand 75 is provided with two oppositely disposed first stop plates 74 mounted slidably thereon so as to be movable between a first position in which they protrude through the external cylindrical periphery of the cylinder and a second position in which they are located entirely internally of the cylinder. The first stop plates 74 have extensions 742 located at their inboard ends to regulate sliding contact between the stop plates 74 and the leaf springs 73. Located outboard of the extensions 742, they also have nick-bend pieces 741 having curved tips. The first stop plates 74 are biased outwardly in the horizontal direction by way of the leaf springs 73, causing the nick-bend pieces 741 to butt against slant faces 111 provided on projections 11 of the upper cylinder portion 1, The nick-bend pieces 741 are thus kept in sliding contact with the slant faces 111 during the up and down movements of the first control stand 75.

The second control mechanism 8 is composed of an operative shaft 4 which is provided at its upper end with a cam 43 having operative pins 431 on the upper face thereof, a second control stand 84 molded from synthetic resin, and two oppositely disposed second stop plates 81 mounted slidably on the second control stand 84 so as to be movable between a first position in which they protrude through the external cylindrical periphery of the cylinder and a second position in which they are located entirely internally of the cylinder. The second stop plates 81 are biased outwardly in the horizontal direction along the second control stand 84 by way of leaf springs 82. The previously mentioned bearing 5 journals the operative shaft 4, a larger diameter portion 52 of the bearing 5 being provided to receive a larger diameter portion 412 of the operative shaft 4 and a smaller diameter portion 53 of the former being provided to receive a smaller diameter portion 411 of the latter. The cam 43 is inserted into the second control stand 84, and the operative pins 431 thereof abut hooks 812 provided at the rear end of the second stop plates 81. The leaf springs 82 are inserted through cavities 841 in the second control stands 84 and into cavities 811 in the stop plates 81. The leaf springs 82 bear against the outboard surfaces of the cavities 811 to bias the second stop plates outwardly in the manner mentioned previously. The second control stand 84 equipped with said second stop plates 81 and the leaf springs 82 is secured to the operative axis 4 by washers 83 and 48.

OPERATION OF THE PREFERRED EMBODIMENT

FIG. 1 shows the spindle adapter as inserted into a record player. When the spindle adapter is not inserted into a record player, the rotatable lower cylinder portion 3 of the adapter outer cylinder can slide down the outer surface of the bearing 5 until the inner projection 30 comes into contact with the stop ring 56. When the adapter is inserted into the turn table T, the rotatable lower cylinder portion 3 is forced upward by contact with the upper surface of the turn table T until stopped resiliently by the spring 42. When this happens, the bearing 5 surrounding the operative shaft 4 is engaged, by way of projection 54, to a notch (not shown) provided on the bearing (not shown) for the turn table T. Since the lower end of the operative shaft 4 is in contact with a spindle adapter driving mechanism (not shown), the operative shaft 4 moves relative to the bearing 5 until the upper end of its larger diameter portion 412 and the smaller diameter portion 53 of the bearing 5 meet each other. This upward movement of the operative shaft 4 causes the second control mechanism 8 secured to the operative shaft 4 to rise, which in turn forces the first control stand 75 and the rest of the first control mechanism 7 upwardly against the effect of the spring 72 to a position above the position defined by the previously mentioned stop projection (not shown) on the upper cylinder portion 1. The upper cylinder portion 1 is fixedly connected to the middle cylinder portion 2 by bridging means at right angles to the section shown in FIG. 1, thereby fixing the axis securing portion 12 against which the spring 72 abuts relative to the middle cylinder portion 2, the bearing 5, the projection 54, and ultimately, the turn table T. The forcing up of the first control stand 75 causes the nick-bend pieces 741 of the first stop plates 74 to slidably contact with the slant faces 111 and the first stop plates 74 to slide inwardly in the horizontal direction against the effect of the leaf springs 73. At this point, since the second stop plates 81 are projecting through the surface of the spindle and the first stop plates 74 are retracted to positions entirely within the interior of the spindle, a stack of records mounted on the spindle will be supported entirely by the second stop plates 81.

Then, when one or more records have been mounted on the spindle and the record player turned on, the spindle adapter driving mechanism (not shown) moves the operative shaft 4 axially from the fully contracted position which it had assumed in the previous step to an intermediate position. This motion relieves the pressure on the spring 72, permitting the first control stand 75 and the related components of the first control mechanism 7 to slide down the shaft 71 to the stop projection (not shown) provided on the upper cylinder 1, where they are stopped. With the lowering of the first control stand 75 and the related components to the stop projection, the leaf springs 73 cause the nick-bend pieces 741 of the first stop plates 74 to slide outwardly along the slant faces 111 and outboard portions of the first stop plates 74 to protrude outwardly through the surface of the spindle. Since the first and second stop plates are axially spaced by a distance equal to the thickness of one record, the outboard portions of the first stop plates 74 will be inserted between the bottom record and the next record above it in a stack of records supported by the second stop plates 81. Once the first stop plates 74 are so inserted, they will support all but the bottom record in such a stack, leaving the second stop plates 81 to support only the bottom record.

At that point, a detector (not shown) incorporated in the spindle adapter driving mechanism (not shown) checks whether a record is mounted or not on the second stop plates 81 by the weight of the record mounted thereon. When it is detected that a disc is so mounted, the second control mechanism 8 and the operative shaft 4 are further lowered from the intermediate position to a fully extended axial position, thereby actuating a switch in the spindle adapter driving mechanism. This switch actuation rotates the operative axis 4 by way of the driving mechanism, causing the operative pins 431 on the cam 43 provided on the operative shaft 4 to bear against the hooks 812 of the second stop plate 81, thereby sliding the stop plates 81 inwardly in the horizontal direction against the spring effect of the leaf spring 82. When the stop plates 81 are fully retracted, the bottom record in the stack is released, dropped, and mounted on the turn table T.

After the record has been mounted on the turn table T in the above fashion, the operative shaft 4 is caused to rotate in the opposite direction to resume its original position, releasing the pressure on the hooks 812 and thereby returning the second stop plates 81 to their extended positions by way of the spring force of the leaf springs 82. The operative shaft 4 is also forced up to the fully contracted position by the spindle driving mechanism, thereby raising the second control mechanism 8, which is secured to the shaft 4, together with the first control stand 75 and the related components of the first control mechanism 7. Accordingly, the first stop plates 74 of the first control mechanism 7 release the second record and those successive thereafter by way of the nick-bend pieces 741 and, therefore, the remaining records fall to the second stop plates 81 and are stopped thereby. Upon completion of the foregoing operations, the spindle adapter is put in waiting condition until the completion of the play back performance.

When the play back performance of the first record is completed, the operative shaft 4 is lowered to its intermediate position again, and the above-described operations are repeated. When all of the records have been played back, the previously mentioned (but not shown) detector incorporated in the spindle adapter driving mechanism (also not shown) detects that no record is mounted on the second stop plates 81 when the mechanism comes to that point in its cycle. When it detects that no record is mounted on the second stop plates 81, the spindle adapter driving mechanism returns the spindle adapter to the state shown in FIG. 1, and the record player turns off.

CAVEAT

While the present invention has been illustrated by a detailed description of a preferred embodiment thereof, it will be obvious to those skilled in the art that various changes in form and detail can be made therein without departing from the true scope of the invention. For that reason, the invention must be measured by the claims appended hereto and not by the foregoing preferred embodiment.

What is claimed is:

1. A spindle adapter apparatus comprising:

1. a hollow cylinder the exterior of which is shaped to engage the central aperture of records to be played;
2. a first stop plate mounted in said hollow cylinder and movable between a first position in which it protrudes through the external cylindrical periphery of said cylinder and a second position in which it is located entirely internally of the external cylindrical periphery of said hollow cylinder, whereby said first stop plate is adapted to support one or more records above a turntable when in its first position;
3. a second stop plate mounted in said hollow cylinder a distance below said first stop plate equal to the thickness of one record, said second stop plate likewise being movable between a first position in which it protrudes from the external cylindrical periphery of said cylinder and a second position in which it is located entirely internally of the external cylindrical periphery of said hollow cylinder, whereby said second stop plate is likewise adapted to support one or more records above the turntable when in its first position;
4. an operative shaft mounted in said hollow cylinder coaxially thereof, axially movable therein among a fully extended first axial position, an intermediate second axial position, and a fully contracted third axial position, and rotatably movable therein between first and second rotary positions;
5. means for operatively connecting said operative axis to said first and second stop plates so that,
    a. when said first stop plate is in its first position, said second stop plate is likewise in its first position, and said operative shaft is moved by external means from said first axial position to said third axial position while being retained in said first rotary position, said first stop plate is moved from its first position to its second position, permitting one or more records to be slid down over said hollow cylinder to a position to be supported by said second stop plate,
    b. when said first stop plate is in its second position, said second stop plate is in its first position, and said operative shaft is moved by external means from said third axial position to said second axial position while being retained in said first rotary position, said first stop plate is moved from its second position to its first position, wherein said first stop plate is in a position to support all but the bottom record of a plurality of records previously supported by said second stop plate,
    c. when said first stop plate is in its first position, said second stop plate is likewise in its first position, and said operative shaft is moved by external means from said second axial position to said first axial position and from said first rotary position to said second rotary position, said second stop plate is moved from its first position to its second position, permitting a record supported by said second stop plate to be released, and
    d. when said first stop plate is in its first position, said second stop plate is in its second position, and said operative shaft is moved by external means from said first axial position to said third axial position and from said second rotary position to said first rotary position, said second stop plate is moved from its second position to its first position and said first stop plate is moved from its first position to its second position, permitting any record discs supported by said first stop plate to slide down over said hollow cylinder to a position to be supported by said second stop plate.

2. A spindle adapter apparatus as claimed in claim 1 and further comprising a third stop plate mounted in said hollow cylinder and oppositely disposed relative to said first stop plate at the same axial level as said first stop plate, said third stop plate being operatively connected to said operative shaft so that its movements are the mirror image of the movements of said first stop plate.

3. A spindle adapter apparatus as claimed in claim 1 and further comprising a fourth stop plate mounted in said hollow cylinder and oppositely disposed relative to said second stop plate at the same axial level as said second stop plate, said fourth stop plate being operatively connected to said operative axis so that its movements are the mirror image of the movements of said second stop plate.

4. A spindle adapter apparatus as claimed in claim 1 wherein said first stop plate is normally biased towards its first position.

5. A spindle adapter apparatus as claimed in claim 4 wherein the normal biasing of said first stop plate is accomplished by means of a first leaf spring mounted on a first control stand axially slidable on a fixed shaft which is mounted in the interior of said hollow cylinder co-axially with said operative shaft, said first leaf spring being butted against an interior surface of said first stop plate.

6. A spindle adapter apparatus as claimed in claim 5 wherein the movement of said first stop plate from its first position to its second position is accomplished by means of a portion of said first stop plate which engages a portion of the interior of said hollow cylinder which is sloped at an angle to said fixed axis, whereby the axial motion of said first control stand on said fixed shaft causes said portion of said first stop plate to bear against said sloped portion of the interior of said hollow cylinder, causing said first control stand to move from its first position to its second position as said first control stand is slid axially on said fixed shaft in the direction in which said sloped portion of the interior of said hollow cylinder is sloped towards said fixed axis.

7. A spindle adapter apparatus as claimed in claim 1 wherein said second stop plate is normally biased towards its first position.

8. A spindle adapter apparatus as claimed in claim 7 wherein the normal biasing of said second stop plate is accomplished by means of a second leaf spring mounted on a second control stand fixedly mounted on said operative shaft, said second leaf spring being butted against an interior surface of said second stop plate.

9. A spindle adapter apparatus as claimed in claim 8 wherein the movement of said second stop plate from its first position to its second position is accomplished by means of a cam mounted on said operative shaft adjacent to said second stop plate, said cam having an operative pin thereon radially spaced from said operative shaft but being disposed generally parallel thereto and located so as to engage an outwardly facing inner surface of said second stop plate, whereby, when said operative shaft is rotated from its first rotary position to its second rotary position, the component of said motion of the operative pin parallel to a line between the operative shaft and the exterior portion of the second stop plate causes the second stop plate to move from its first position to its second position while the component of the motion of the operative pin perpendicular to the line between said operative shaft and the exterior portion of the second stop plate is lost.

* * * * *